(12) United States Patent
Retief et al.

(10) Patent No.: US 8,778,291 B2
(45) Date of Patent: Jul. 15, 2014

(54) TREATMENT OF ZIRCONIA-BASED MATERIAL WITH AMMONIUM BI-FLUORIDE

(75) Inventors: Willem Liebenberg Retief, Eldoraigne (ZA); Nelius Dempers Retief, legal representative, Kosmosdal (ZA); Johannes Theodorus Nel, Kempton Park (ZA); Wilhelmina Du Plessis, Centurion (ZA); Philippus Lodewyk Crouse, Pretoria (ZA)

(73) Assignee: The South African Nuclear Energy Corporation Limited, District Brits (ZA)

( * ) Notice: Subject to any disclaimer, the term of this patent is extended or adjusted under 35 U.S.C. 154(b) by 159 days.

(21) Appl. No.: 13/387,541

(22) PCT Filed: Jul. 29, 2010

(86) PCT No.: PCT/IB2010/053448
§ 371 (c)(1),
(2), (4) Date: Jul. 18, 2012

(87) PCT Pub. No.: WO2011/013085
PCT Pub. Date: Feb. 3, 2011

(65) Prior Publication Data
US 2013/0011329 A1  Jan. 10, 2013

(30) Foreign Application Priority Data
Jul. 29, 2009  (ZA) ................................ 2009/05297

(51) Int. Cl.
*C01B 9/08* (2006.01)
*C01B 33/08* (2006.01)
*C01G 25/04* (2006.01)

(52) U.S. Cl.
USPC ............................ 423/341; 423/464; 423/489

(58) Field of Classification Search
USPC ........................................ 423/341, 464, 489
See application file for complete search history.

(56) References Cited

U.S. PATENT DOCUMENTS 5,688,477 A * 11/1997 Nel .................................. 423/82
5,958,355 A *  9/1999 Nel ................................ 423/472

FOREIGN PATENT DOCUMENTS

| EP | 0 434 222 A1 | 6/1991 |
| EP | 0 665 189 A1 | 8/1995 |
| GB | 1 447 276 | 8/1976 |
| RU | 2 048 559 C1 | 11/1995 |
| WO | WO 2009/016903 A1 | 2/2009 |

OTHER PUBLICATIONS

International Search Report from the European Patent Office in International Application No. PCT/IB/2010/53448 mailed Sep. 22, 2010.
Written Opinion of the International Searching Authority in International Application No. PCT/IB2010/053448. mailed Sep. 22, 2010.
Braglia, et al., "Different Fluorination Processes With Ammonium Bifluoride and Their Effect on Fluorozirconate Glasses", Mat. Res. Bull., vol. 24, pp. 661-669, (1989).
Sanghera, et al., "New Fluorination Reactions of Ammonium Bifluoride", J. Am. Chem. Soc., 73 (5), pp. 1339-1346, (1990).
Guzeev, et al., "Autoclave Breakdown of Zircon with Ammonium Fluorides", Inorganic Synthesis and Industrial Inorganic Chemistry, Russian Journal of Applied Chemistry, vol. 79, No. 11, pp. 1757-1760, (2006).
English-language Alerting Abstract of RU 2 048 559 C1 (1 page) (1995).

* cited by examiner

*Primary Examiner* — Timothy Vanoy
(74) *Attorney, Agent, or Firm* — Finnegan, Henderson, Farabow, Garret & Dunner, LLP.

(57) ABSTRACT

A process for treating a zirconia-based material comprises reacting, in a reaction step, the zirconia-based material with ammonium bifluoride, $NH_4F.HF$. An ammonium fluorozirconic compound is produced.

12 Claims, 2 Drawing Sheets

TREATMENT OF ZIRCONIA-BASED MATERIAL WITH AMMONIUM BI-FLUORIDE

CROSS REFERENCE TO RELATED APPLICATIONS

Figure 1:
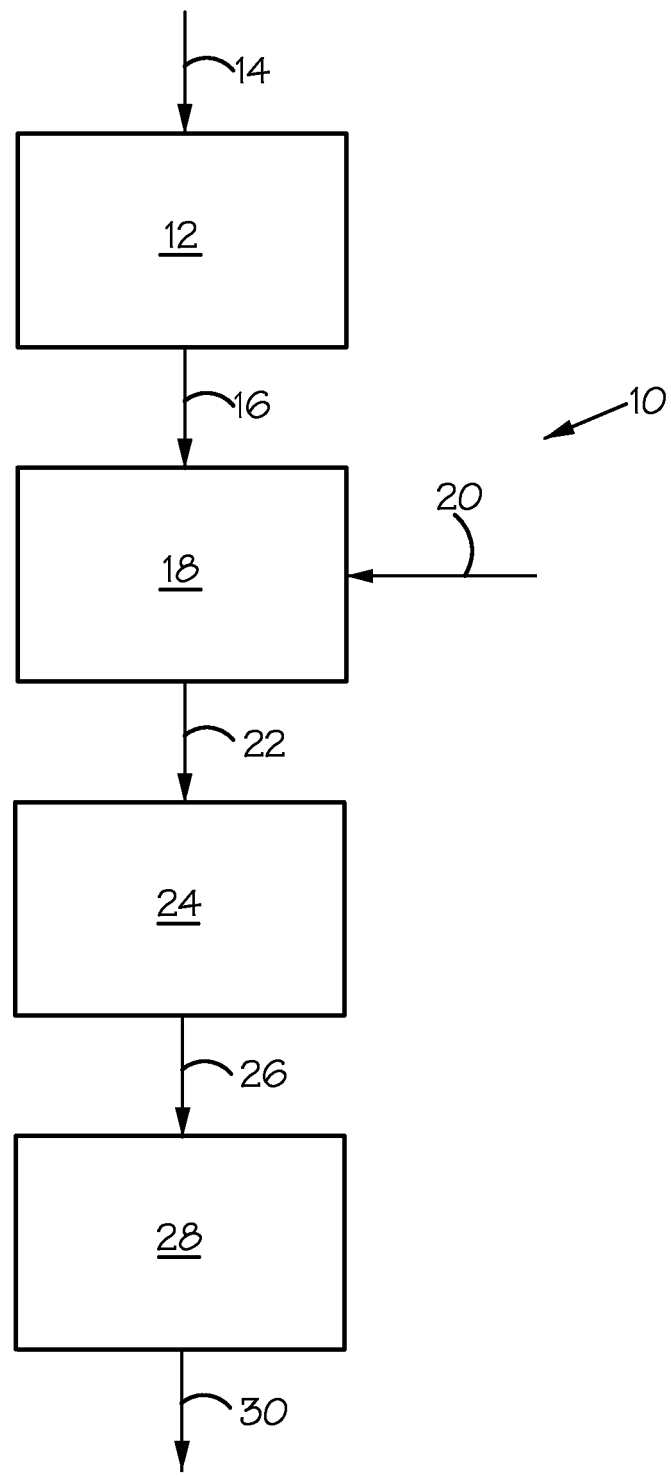

This application is an national phase application based on PCT/IB2010/053448 filed Jul. 29, 2010, the content of which is incorporated herein by reference, and claims the right to priority based on South African Application No. 2009/05297, filed Jul. 29, 2009.

THIS INVENTION relates to the treatment of a chemical. It relates in particular to a process for treating a zirconia-based material.

In order to manufacture downstream zirconium containing chemicals or to obtain zirconium metal from a zirconium-bearing starting material, the starting material must be solubilized and the solubilized intermediate products that are formed must be purified to conform to specifications of, inter alia, purity as dictated by end use applications. Nuclear-grade zirconium metal, for example, has to conform to very stringent purity specifications. Typically, for nuclear grade zirconium metal, a hafnium content of less than 100 ppm is required from a thermal neutron cross-section absorption perspective. However, zirconium-bearing materials, such as zircon ($ZrSiO_2$), are notoriously difficult to solubilize, and typically high temperature alkaline melting processes or high temperature carbochlorination processes are required to achieve solubilization of such materials. It is thus an object of the present invention to provide a means whereby zirconium-bearing materials can more readily be treated to obtain useful intermediate and final products therefrom.

Thus, according to the invention, there is provided a process for treating a zirconia-based material which comprises reacting, in a reaction step, the zirconia-based material with ammonium bifluoride, $NH_4F.HF$, to produce an ammonium fluorozirconic compound.

The zirconia-based material may be dissociated zircon, $ZrO_2.SiO_2$ or 'DZ', such as plasma dissociated zircon, 'PDZ'. The reaction step then proceeds in accordance with reaction 1.1 (unbalanced):

$$ZrO_2.SiO_2 + NH_4F.HF \rightarrow (NH_4)_3ZrF_7 + (NH_4)_2SiF_6 + H_2O \quad \quad 1.1$$

$(NH_4)_3ZrF_7$ and $(NH_4)_2SiF_6$ are thus produced as reaction products.

Instead, the zirconia-based material may be at least partially desilicated dissociated zircon which has a desilicated zirconia component, $ZrO_2$. The desilicated zirconia component then, in the reaction step, reacts in accordance with reaction 1.2 (unbalanced):

$$ZrO_2 + NH_4F.HF \rightarrow (NH_4)_3ZrF_7 + H_2O \quad \quad 1.2$$

$(NH_4)_3ZrF_7$ is thus produced as a reaction product. The desilicated dissociated zircon may be either partially desilicated dissociated zircon or wholly desilicated dissociated zircon. It will be appreciated that when the dissociated zircon is only partially desilicated, some $(NH_4)_2SiF_6$ will also form as a reaction product.

The dissociated zircon, when used, can be that obtained by any suitable process, particularly a thermal process. Thus, for example, it can be that obtained by destroying the crystal matrix of zircon ($ZrSiO_4$) by heating it to a high temperature in a plasma furnace or a plasma generator, under oxidizing, inert or reducing conditions. Zircon is a mineral which is abundantly available at relatively low cost, but is chemically inert. Thus, inert zircon mineral is rendered amenable to chemical processing in accordance with the invention, by means of the plasma dissociation. During the plasma dissociation, zircon is dissociated into separate zirconia ($ZrO_2$) and silica ($SiO_2$) mineral phases, with the product commonly designated as dissociated zircon ('DZ'), plasma dissociated zircon ('PDZ'), or $ZrO_2.SiO_2$.

The reaction may be conducted at a temperature below about 250° C., typically at about 180° C.

The reaction may be carried out for a reaction period of between a few minutes, e.g. about 2 minutes, and 3 hours, typically between about 5 and about 30 minutes, depending on the particle size of the dissociated zircon and reaction conditions.

The process may include thermally treating the reaction product(s) of reaction 1.1 and reaction 1.2 to effect thermal decomposition thereof, thereby to form an anhydrous isomorph of zirconium fluoride, $ZrF_4$. Desired zirconium products can then be formed from the zirconium fluoride.

In one embodiment of the invention, i.e. when reaction products in accordance with reaction 1.1 are formed, the thermal treatment may include a first thermal treatment step, following the reaction step, in which volatilization, or sublimation, of $(NH_4)_2SiF_6$ is effected at a temperature between about 250° C. and about 300° C., typically at about 280° C., in accordance with reaction 2:

$$(NH_4)_2SiF_6(s) \rightarrow (NH_4)_2SiF_6(g) \quad \quad 2$$

The process may then also include a second thermal treatment step, following the first thermal treatment step, in which thermal decomposition of $(NH_4)_3ZrF_7$ is effected at a temperature above about 300° C., typically at about 450° C., in accordance with reaction 3:

$$(NH_4)_3ZrF_7 \rightarrow ZrF_4 + 3NH_3 + 3HF \quad \quad 3$$

In the second thermal treatment step, the $(NH_4)_3ZrF_7$ is thus thermally decomposed to $ZrF_4$ and $NH_4F$, with ammonia ($NH_3$) and hydrogen fluoride (HF) being released from the $NH_4F$ as further decomposition products.

The process may, in particular, be carried out in a closed reactor, to prevent loss of gaseous components, such as reactive gaseous HF and $NH_3$. The reactor may typically have three distinct adjacent temperature zones, such that the reaction step, the first thermal treatment step and the second thermal treatment step each take place in a separate temperature zone, with the reaction products passing sequentially from the one zone to the next. Thus, the reaction step will be effected in a first relatively cool temperature zone, the first thermal treatment step being effected in a second temperature zone which is at a higher temperature than the first temperature zone, and the second thermal treatment step being effected in a third temperature zone adjacent the second temperature zone and which is at a higher temperature than the second temperature zone.

In another embodiment of the invention, i.e. when the reaction product in accordance with reaction 1.2 is formed, the thermal treatment may include thermally decomposing $(NH_4)_3ZrF_7$ at a temperature above about 300° C., in accordance with reaction 3.

The process may then also be carried out in a closed reactor, as hereinbefore described.

Generally, the reactor may be a rotary kiln.

The invention will now be described by way of non-limiting example, with reference to the accompanying drawings.

Figure 2:
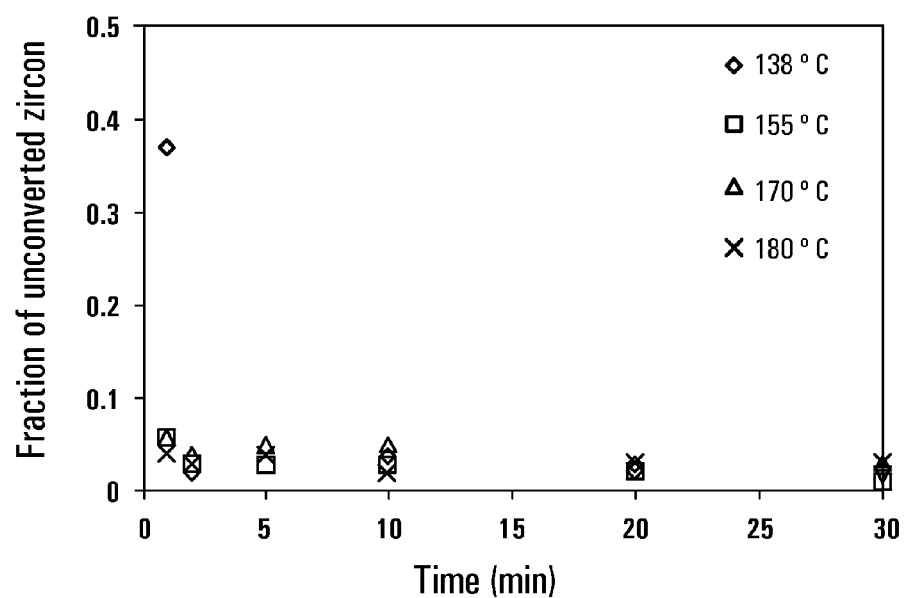

In the drawings,

FIG. 1 is a simplified flow diagram of a process according to the invention for treating plasma dissociated zircon ('PDZ'); and FIG. 2 is, in respect of the Example, a plot of efficiency of conversion of dissociated zircon using ammonium bifluoride in terms of the fraction of unconverted starting material.

Referring to FIG. 1, reference numeral 10 generally indicates a process for treating PDZ.

Upstream of the process 10, there is provided a plasma dissociation stage 12. A zircon ($ZrSiO_4$) feed line 14 leads into the stage 12. A PDZ transfer line 16 leads from the stage 12 to a reaction step or stage 18, which forms part of the process 10. An ammonium bifluoride ($NH_4F.HF$) feed line 20 also leads into the stage 18. A reaction product transfer line 22 leads from the stage 18 to a first thermal treatment step or stage 24. A first thermal stage product transfer line 26 leads from the stage 24 to a second thermal treatment step or stage 28. A second thermal stage product line 30 leads from the stage 28.

In use, zircon ($ZrSiO_4$) is fed, along the feed line 14, into the plasma dissociation stage 12. In the stage 12, the zircon is dissociated, by means of plasma dissociation, into PDZ. The PDZ passes along the flow line 16 to the reaction stage 18.

$NH_4F.HF$ is fed, in addition to the PDZ, into the reaction stage 18 along feed line 20. In the stage 18, the $NH_4H.HF$ and PDZ react, at a temperature of about 180° C., according to reaction (1.1). The reaction period is typically between about 5 and 30 minutes. $(NH_4)_3ZrF_7$ and $(NH_4)_2SiF_6$ are thus formed as reaction products, which pass into the first thermal treatment stage 24 along transfer line 22.

In the first thermal treatment stage 24, the $(NH_4)_3ZrF_7$ and $(NH_4)_2SiF_6$ are subjected to thermal treatment at a temperature of about 280° C. and a reaction period of about 5 minutes, leading to volatilization of the $(NH_4)_2SiF_6$ in accordance with reaction (2). The residual $(NH_4)_3ZrF$ passes to the second thermal treatment stage 28 along transfer ling 26.

In the second thermal treatment stage 28, the $(NH_4)_3ZrF_7$ is subjected to thermal treatment at a temperature of about 450° C. and for a reaction period of about 10 minutes, leading to the decomposition of the $(NH_4)_3ZrF_7$ into $ZrF_4$ in accordance with reaction (3). The $ZrF_4$ is withdrawn along the product line 30. Gaseous HF and $NH_3$ are also formed in the second thermal treatment stage 28.

The reaction stage 18, the first thermal treatment stage 24 and the second thermal treatment stage 28 are typically provided by a rotary kiln (not illustrated) having three distinct temperature zones, each zone representing one of the stages 18, 24, and 28. It will be appreciated that the transfer lines 22 and 26 respectively then represent the transfer of reaction product and $(NH_4)_3ZrF$ from one temperature zone to the next, within the kiln.

EXAMPLE

A series of laboratory scale experiments simulating the reaction step or stage 18 of the process 10 under selected reaction conditions of temperature and reaction time were conducted. In each of these experiments 94% pure PDZ, as starting material, was reacted with twice the stoichiometrically required amount of $NH_4F.HF$, to ensure that maximum conversion of PDZ is achieved. Thus, for every 1 g of PDZ, 8 g of $NH_4F.HF$ were used. The 6% impurity in the starting material was mainly undissociated zircon as determined by chemical analysis.

These experiments were conducted in four series, respectively at temperatures of 138° C., 155° C., 170° C. and 180° C., all of which are above the melting point of the $NH_4F.HF$. Six experiments were done in each series, each terminating after the selected reaction times of 1, 2, 5, 10, 20 and 30 minutes (FIG. 2).

In each experiment the $NH_4F.HF$ was first placed in a PTFE (polytetrafluoroethylene) reaction vessel, or crucible, and was preheated to the selected temperature in a furnace until completely molten.

The crucible was then briefly removed from the furnace and the accurately weighed PDZ, was added to the molten $NH_4F.HF$.

The crucible was then returned to the furnace for the selected reaction period, at the end of which the crucible and its contents were removed from the furnace and allowed to cool down to room temperature inside a fume hood. Once cooled, the contents of the crucible were dissolved in water and the resulting solution filtered and the filter paper dried and weighed in order to determine the conversion of PDZ to $(NH_4)_3ZrF$ and $(NH_4)_2SiF_6$ for each combination of reaction conditions, in terms of the fraction of residue on the filter (FIG. 2).

It was found that essentially complete conversion was achieved within a reaction time or period of about 5 minutes with only the 6% undissociated zircon fraction of the PDZ starting material remaining as a residue, since all the reaction products and the surplus $NH_4F.HF$ are water soluble. The observed decrease in the amount of residue after about 5 minutes can be ascribed to the slow conversion of the remaining 6% undissociated zircon.

Using undissociated zircon as starting material, the reaction step or stage 18 was repeated at a temperature of 180° C. and for a period of 30 minutes and it was found that almost no reaction of the undissociated zircon with the $NH_4F.HF$ took place under these conditions.

Thus, the Applicant has found that the invention unexpectedly provides a cost effective manner for obtaining from zirconium-bearing materials, in particular zircon in its dissociated form, useful zirconium-containing products, which are amenable to further processing, e.g. to obtain zirconium metal as an end product.

Further, the invention provides an anhydrous route for beneficiation of zirconium-bearing materials, enabling the manufacture of anhydrous $ZrF_4$. $ZrF_4$ is the preferred precursor for a number of applications, rather than hydrous $ZrF_4.H_2O$, which is formed when using a hydrous solubilization route to treat such materials, which has hitherto been the case.

The invention claimed is:

1. A process for treating dissociated zircon which comprises reacting, in a reaction step, dissociated zircon, $ZrO_2.SiO_2$, with ammonium bifluoride, $NH_4F.HF$ in accordance with reaction 1.1

$$ZrO_2.SiO_2 + NH_4F.HF \rightarrow (NH_4)_3ZrF_7 + (NH_4)_2SiF_6H_2O \qquad 1.1,$$

with $(NH_4)_3ZrF_7$ and $(NH_4)_2SiF_6$ thus being produced as reaction products, to produce an ammonium fluorozirconic compound.

2. A process according to claim 1, wherein the reaction is conducted at a temperature below about 250° C.

3. A process according to claim 2, wherein the reaction is carried out for a reaction period of between two minutes and 3 hours.

4. A process according to claim 1, wherein the reaction is carried out for a reaction period of between two minutes and 3 hours.

5. A process according to claim 4, wherein the reaction period is between about 5 and about 30 minutes.

6. A process according to claim 1, which includes thermally treating the reaction products of reaction 1.1 to effect thermal decomposition thereof, thereby to form an anhydrous isomorph of zirconium fluoride, $ZrF_4$.

7. A process according to claim 6, wherein the thermal treatment includes a first thermal treatment step, following the reaction step, in which volatilization of $(NH_4)_2SiF_6$ is effected at a temperature between about 250° C. and about 300° C. in accordance with reaction 2:

$$(NH_4)_2SiF_6(s) \rightarrow (NH_4)_2SiF_6(g) \qquad 2.$$

8. A process according to claim 7, which includes a second thermal treatment step, following the first thermal treatment step, in which thermal decomposition of $(NH_4)_3ZrF_7$ is effected at a temperature above about 300° C., in accordance with reaction 3:

$$(NH_4)_3ZrF_7 \rightarrow ZrF_4 + 3NH_3 + 3HF \qquad 3.$$

9. A process according to claim 8, which is carried out in a closed reactor, to prevent loss of gaseous components.

10. A process according to claim 9, wherein the reactor has three distinct adjacent temperature zones, such that the reaction step, the first thermal treatment step and the second thermal treatment step each take place in a separate temperature zone, with the reaction products passing sequentially from the one zone to the next, the reaction step being effected in a first relatively cool temperature zone, the first thermal treatment step being effected in a second temperature zone which is at a higher temperature than the first temperature zone, and the second thermal treatment step being effected in a third temperature zone adjacent the second temperature zone and which is at a higher temperature than the second temperature zone.

11. A process according to claim 10, wherein the reactor is a rotary kiln.

12. A process according to claim 9, wherein the reactor is a rotary kiln.

* * * * *